(12) United States Patent
Wu

(10) Patent No.: US 12,407,371 B2
(45) Date of Patent: Sep. 2, 2025

(54) DYNAMIC TUNING METHOD FOR TIME-AVERAGE SAR AND USER EQUIPMENT THEREOF

(71) Applicant: MEDIATEK INC., Hsinchu (TW)

(72) Inventor: Chun-Yen Wu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 329 days.

(21) Appl. No.: 17/823,159

(22) Filed: Aug. 30, 2022

(65) Prior Publication Data
US 2024/0072835 A1   Feb. 29, 2024

(51) Int. Cl.
*H04B 1/3827* (2015.01)
*H04W 52/36* (2009.01)

(52) U.S. Cl.
CPC ........ *H04B 1/3838* (2013.01); *H04W 52/367* (2013.01)

(58) Field of Classification Search
CPC ............ H04W 52/367; H04W 52/225; H04W 52/245; H04W 52/283; H04W 52/42; H04W 52/146; H04W 52/18; H04W 52/228; H04W 72/0453; H04W 52/143; H04W 52/38; H04W 28/065; H04W 88/02; H04W 52/226; H04W 52/243; H04W 52/34; H04W 52/288; H04W 24/10; H04B 1/3838; H04B 1/0458; H04B 17/102; H04B 1/18; H04B 1/006; H04B 17/318; H04B 7/0608; H04B 1/0053; H04B 1/0067; H04B 17/101; H04B 1/0057; H04B 1/406; H04B 7/0404; H04B 7/0602; H04B 1/401; H04B 17/103; H04B 17/104; H04B 17/13; H04B 7/0465; H04B 7/0623
See application file for complete search history.

(56) References Cited

U.S. PATENT DOCUMENTS

| | | | |
|---|---|---|---|
| 9,774,361 B2 | 9/2017 | Hong | |
| 11,432,249 B1* | 8/2022 | Sambhwani | H04B 17/102 |
| 2016/0174168 A1* | 6/2016 | Lu | H04W 52/26 |
| | | | 455/522 |
| 2017/0064641 A1* | 3/2017 | Logan | H04W 52/367 |

(Continued)

FOREIGN PATENT DOCUMENTS

| | | | |
|---|---|---|---|
| CN | 105897356 A | 8/2016 | |
| CN | 109982423 A | 7/2019 | |

(Continued)

OTHER PUBLICATIONS

Chinese language office action dated May 16, 2024, issued in application No. TW 112120541.

*Primary Examiner* — Golam Sorowar
(74) *Attorney, Agent, or Firm* — McClure, Qualey & Rodack, LLP

(57) ABSTRACT

User equipment (UE) for a time-average specific absorption rate (SAR) is provided. The UE includes a processor and a switch circuit. The processor may determine the current frequency band in which the UE is operating and select a code word combination within a unit of time from a plurality of code words based on the current frequency band. The switch circuit is coupled to the processor. The switch circuit may switch to a switch state based on the selected code word combination, wherein each switch state corresponds to a corresponding cord word of the selected code word combination.

16 Claims, 4 Drawing Sheets

(56) References Cited

U.S. PATENT DOCUMENTS

| | | | |
|---|---|---|---|
| 2018/0288709 A1* | 10/2018 | Yao ..................... | H04W 52/367 |
| 2020/0374804 A1 | 11/2020 | Mukkavilli et al. | |
| 2021/0314876 A1* | 10/2021 | Zhao ..................... | H04W 52/38 |
| 2022/0070796 A1* | 3/2022 | Nadakuduti .......... | H04W 52/38 |
| 2022/0103214 A1* | 3/2022 | Gopal .................. | H04B 7/0602 |
| 2022/0232486 A1* | 7/2022 | Caporal Del Barrio ..................... | |
| | | | H04B 17/373 |
| 2022/0286980 A1* | 9/2022 | Lee ......................... | H04M 1/02 |
| 2023/0138665 A1* | 5/2023 | Lu ........................ | H04W 52/283 |
| | | | 370/318 |
| 2023/0139016 A1* | 5/2023 | Nadakuduti ........ | H04W 52/283 |
| | | | 370/318 |
| 2023/0208483 A1* | 6/2023 | Cha ..................... | H04W 52/367 |
| | | | 455/522 |
| 2024/0015669 A1* | 1/2024 | Strauch ............... | H04B 1/3838 |

FOREIGN PATENT DOCUMENTS

| | | |
|---|---|---|
| CN | 112040537 A | 12/2020 |
| CN | 114040489 A | 2/2022 |
| EP | 2693815 A1 | 2/2014 |
| TW | 202106085 A | 2/2021 |

\* cited by examiner

DYNAMIC TUNING METHOD FOR TIME-AVERAGE SAR AND USER EQUIPMENT THEREOF

BACKGROUND OF THE INVENTION

Field of the Invention

The invention generally relates to time-average specific absorption rate (SAR) technology, and more particularly, to a time-average SAR technology in which the switch state is switched or tuned dynamically within a unit of time.

Description of the Related Art

Specific absorption rate (SAR) testing is a measure of the rate at which energy is absorbed per unit mass by a human body when exposed to a radio frequency (RF) electromagnetic field. In the SAR regulation, the exposure power limitation over the time period is specified, i.e., time-average SAR. The radiated power of user equipment (UE) within the unit of time cannot be over the power limitation.

However, in order to follow the limitations of the SAR regulation, in conventional methods, the UE may dynamic tunes the conducted power a radio frequency (RF) circuit of the UE and the antenna matching (or the antenna performance) is fixed. As a result, the user experience may be suffered over the time period specified in the SAR regulation.

Therefore, how to meet the limitations of the SAR regulation and improve user experience is a topic that is worthy of discussion.

BRIEF SUMMARY OF THE INVENTION

A dynamic tuning method and UE for a time-average specific absorption rate (SAR) are provided to overcome the problems mentioned above.

An embodiment of the invention provides a dynamic tuning method for a time-average specific absorption rate (SAR). The dynamic tuning method is applied to a UE. The dynamic tuning method may include the following steps. The processor of the UE determines the current frequency band in which the UE is operating. The processor selects a code word combination within a unit of time from a plurality of code words based on the current frequency band. The switch circuit of the UE switches to a switch state based on the selected code word combination. Each switch state corresponds to the corresponding cord word of the selected code word combination.

In some embodiments, different code words correspond to different respective set values at the same frequency band, and the set values of each code word are different at different frequency bands. In some embodiments, the set values of each code word for different frequency bands are pre-stored in the memory device of the UE. In some embodiments, the values of each code word comprise the antenna total gain value and the total radiate power (TRP) value.

In some embodiments, the conducted power of a radio frequency (RF) circuit of the UE is fixed within the unit of time for the time-average SAR.

In some embodiments, the switch circuit comprises at least one of an impedance tuner and an aperture tuner, wherein a single pole multi-throw, a multi-pole multi-throw, a multi-pole single throw, a multi-pole multi-throw or a switch with variable capacitor may be used in the at least one of the impedance tuner and the aperture tuner.

In some embodiments, each switch state corresponds to a corresponding circuit. When the switch circuit switches to one of the switch states, the corresponding circuit of the switch state is enabled.

In some embodiments, the average transmission power corresponding to the selected code word combination does not exceed the power limitation within the unit of time for the time-average SAR.

An embodiment of the invention provides a UE for a time-average specific absorption rate (SAR). The UE includes a processor and a switch circuit. The processor may determine the current frequency band in which the UE is operating and select a code word combination within a unit of time from a plurality of code words based on the current frequency band. The switch circuit is coupled to the processor. The switch circuit may switch to a switch state based on the selected code word combination, wherein each switch state corresponds to a corresponding cord word of the selected code word combination.

Other aspects and features of the invention will become apparent to those with ordinary skill in the art upon review of the following descriptions of specific embodiments of the dynamic tuning method and UE for the time-average SAR.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
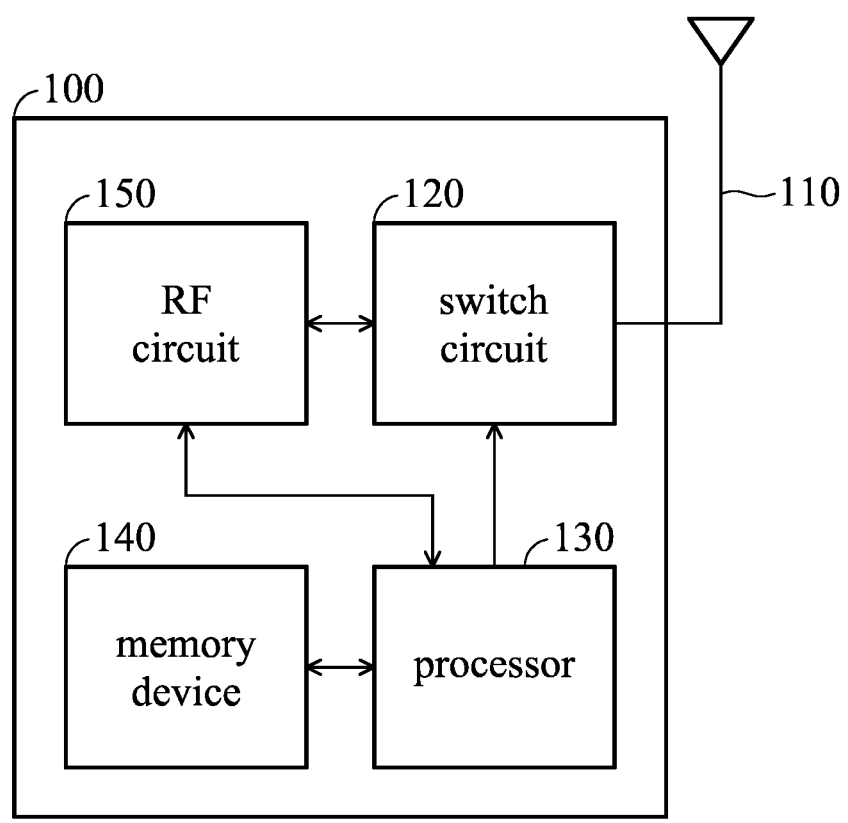
FIG. 1 is a block diagram of a UE according to an embodiment of the invention.

FIG. 1 is a block diagram of a UE 100 according to an embodiment of the invention. As shown in FIG. 1, the UE 100 may comprise an antenna circuit 110, a switch circuit 120, a processor 130, a memory device 140 and a radio frequency (RF) circuit 150. It should be noted that, in order to clarify the concept of the invention, FIG. 1 presents a simplified block diagram in which only the elements relevant to the invention are shown. However, the invention should not be limited to what is shown in FIG. 1. In the embodiments of the invention, the antenna circuit 110 and the switch circuit 120 may be combined or integrated in the same circuit.

In the embodiments of the invention, the UE 100 may be a smartphone, a Personal Data Assistant (PDA), a pager, a laptop computer, a desktop computer, a wireless handset, or any computing device that includes a wireless communications interface.

In the embodiments of the invention, the antenna circuit 110 may receive signals from the network node and transmit signals to the network node. The antenna circuit 110 may comprise one or more antennas.

In the embodiments of the invention, the switch circuit 120 comprises at least one of an impedance tuner and an aperture tuner, wherein a single pole multi-throw, a multi-pole multi-throw, a multi-pole single throw, a multi-pole multi-throw or a switch with variable capacitor may be used in the at least one of the impedance tuner and the aperture tuner, but the invention should not be limited thereto. The switch circuit 120 may switch to a switch state based on the indication or information from the processor 130. Details are discussed below.

In the embodiments of the invention, the processor 130 may control the operations of the switch circuit 120, the memory device 140 and the RF circuit 150. According to an embodiment of the invention, the processor 130 may also be arranged to execute the program codes of the software modules. The program codes accompanied by specific data in a data structure may also be referred to as a processor logic unit or a stack instance when being executed. Therefore, the processor 130 may be regarded as being comprised of a plurality of processor logic units, each for executing one or more specific functions or tasks of the corresponding software modules.

In the embodiments of the invention, the memory device 140 may store the software and firmware program codes, system data, user data, etc. of the UE 100. The memory device 140 may be a volatile memory such as a random access memory (RAM); a non-volatile memory such as a flash memory or a read-only memory (ROM); a hard disk; or any combination thereof. The memory device 140 may store the data and information for the time-average specific absorption rate (SAR). According to an embodiment of the invention, the memory 140 may pre-store the set values of each code word (CW) (or each switch state) for different frequency bands.

Different code words may correspond to different respective set values at the same frequency band and the set values of each code word are different at different frequency bands. For example, the memory 140 may store a plurality of SAR tables in advance. Each SAR table may correspond to a corresponding frequency band and each SAR table may record the set values corresponding to each code word for its corresponding frequency band. Taking Table 1 as an example, the SAR table corresponding to frequency band Band 8 may record the antenna (ANT) total gains, conducted power and total radiated powers (TRP) corresponding to the code word (or switch state) CW1, the core word CW2, the core word CW3, the core word CW4, and the core word CW5. Higher ANT total gain may correspond to higher antenna performance. When the UE 100 has higher antenna performance, it means that the UE 100 may have better connection quality (i.e., the better user experience). It should be noted that Table 1 is only used to illustrate the embodiment of the invention, but the invention should not be limited thereto.

TABLE 1

| Band 8 | switch state | | | | |
| --- | --- | --- | --- | --- | --- |
|  | CW1 | CW2 | CW3 | CW4 | CW5 |
| ANT total gain | −11.5 | −18.7 | −15.8 | −12.8 | −23 |
| Conducted power | 23 | 23 | 23 | 23 | 23 |
| TRP | 11.5 | 4.3 | 7.2 | 10.2 | 0 |

In the embodiments of the invention, the RF circuit 150 may process the received RF signals to convert the received RF signals to baseband signals, or receive baseband signals and convert the received baseband signals to RF signals. The RF circuit 150 may comprise a plurality of hardware elements to perform radio frequency conversion. For example, the RF circuit 150 may comprise a power amplifier, a mixer, an analog-to-digital converter (ADC) and a digital-to-analog converter (DAC), but the invention should not be limited thereto. According to an embodiment of the invention, over the time period for the SAR regulation, i.e., the time-average SAR, the conducted power of the RF circuit 150 is fixed. That is to say, in the invention, the UE 100 may not change transmission power by tuning the conducted power of the RF circuit 150.

According to an embodiment of the invention, the UE 100 may determine a current band in which the UE 100 is operating. Then, the UE 100 may select a code word combination within a unit of time for the time-average SAR from a plurality of code words based on the current frequency band. The average transmission power corresponding to the selected code word combination may not exceed the power limitation over the time period for SAR regulation.

Figure 2:
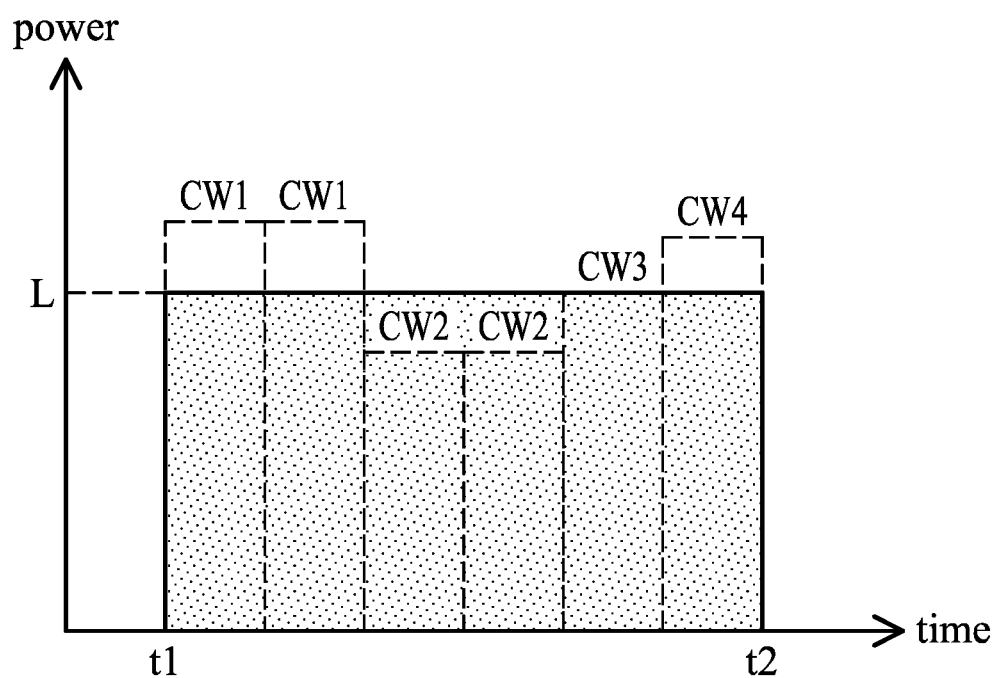
FIG. 2 is a schematic diagram illustrating a code word combination within a unit of time according to an embodiment of the invention.

Taking Table 1 and FIG. 2 for example, as shown in FIG. 2, in the frequency band Band 8, the UE 100 may select the code words (or switch states) CW1, CW2, CW3 and CW4 to be the code word combination within a unit of time for the time-average SAR. The average transmission power of the selected code word combination within the unit of time (e.g., t2−t1) may not exceed the power limitation L within the unit of time for SAR regulation. It should be noted that FIG. 2 is only used to illustrate the embodiment of the invention, but the invention should not be limited thereto. The code word combination may comprise different number of code words (or switch states). The order of the code words of the code word combination within the unit of time for the time-average SAR may be different from FIG. 2.

Figure 3A:
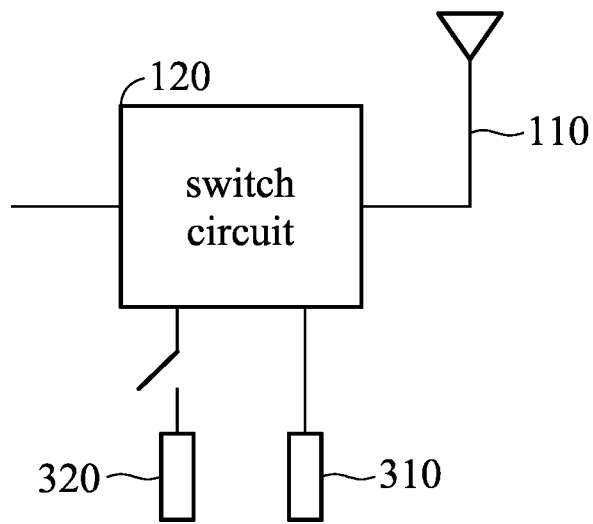
FIGS. 3A-3B are schematic diagrams illustrating the circuits corresponding to different switch states according to an embodiment of the invention.
Figure 3B:
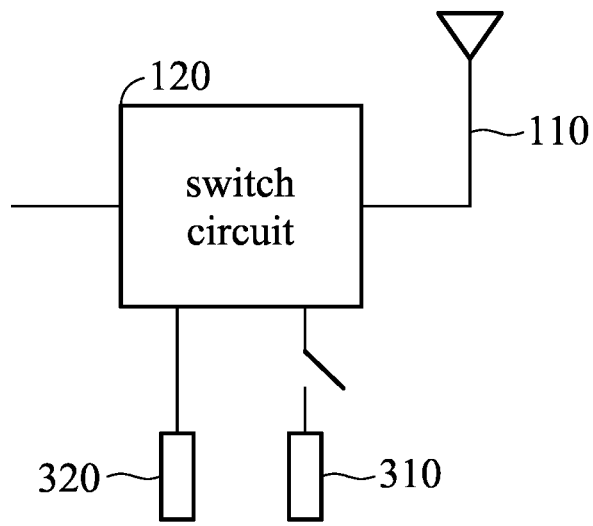

According to an embodiment of the invention, the switch circuit 120 may dynamically switch to a switch state based on the selected code word combination. For example, as shown in FIG. 2, switch circuit 120 may dynamically switch to the switch state CW1, CW2, CW3 or CW4 in the selected code word combination. According to an embodiment of the invention, each switch state may correspond to a corresponding circuit. The switch circuit 120 may dynamically switch to a switch state by switching to the circuit corresponding to the switch state. In other words, the antenna matching (or the antenna performance) of the antenna circuit 110 can be turned or switched dynamically by switching to different switch states. Taking FIG. 3A-3B as an example, the circuit 310 corresponds to switch state CW1 and the circuit 320 corresponds to switch state CW2. As shown in FIG. 3A, when the switch circuit 120 switches to the switch state CW1, the circuit 310 will be enabled. As shown in FIG. 3B, when the switch circuit 120 switches to the switch state CW2, the circuit 320 will be enabled. In an example, the circuit 310 and the circuit 320 may respectively comprise an inductor with different values, but the invention should not be limited thereto.

Figure 4:
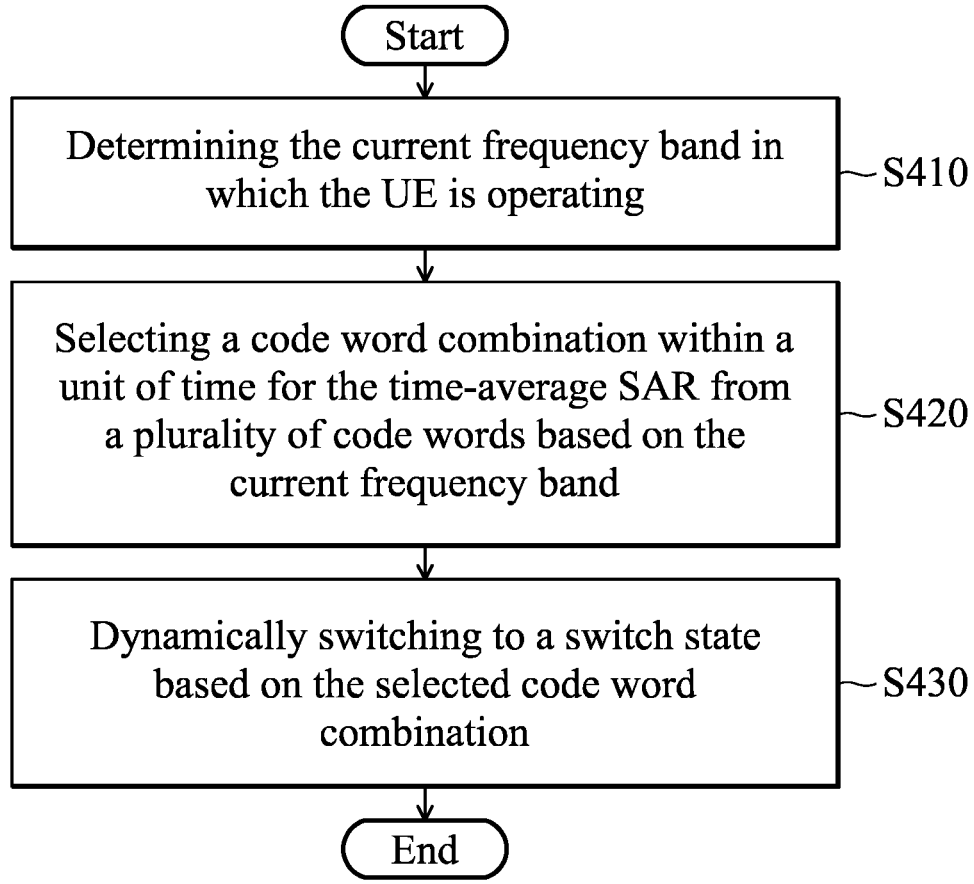
FIG. 4 is a flow chart illustrating a dynamic tuning method for time-average specific absorption rate (SAR) according to an embodiment of the invention.

FIG. 4 is a flow chart illustrating a dynamic tuning method for a time-average specific absorption rate (SAR) according to an embodiment of the invention. The dynamic tuning method can be applied to the UE 100. As shown in FIG. 4, in step S410, the UE 100 may determine the current frequency band in which the UE 100 is operating.

In step S420, the UE 100 may select a code word combination within a unit of time for the time-average SAR from a plurality of code words based on the current frequency band.

In step S430, the UE 100 may dynamically switch to a switch state based on the selected code word combination, wherein each switch state corresponds to a corresponding cord word of the selected code word combination.

According to an embodiment of the invention, in the dynamic tuning method, different code words may correspond to different respective set values at the same frequency band and the set values of each code word may be different at different frequency bands. The set values of each code word for different frequency bands are pre-stored in the memory device of the UE 100. The values of each code word comprise the antenna total gain value and the total radiate power (TRP) value.

According to an embodiment of the invention, in the dynamic tuning method, the conducted power of a radio frequency (RF) circuit of the UE 100 is fixed within the unit of time for the time-average SAR.

In the dynamic tuning method for a time-average SAR provided in the invention, the UE can dynamically switch to a different switch state within the unit of time for the time-average SAR. Therefore, the UE may maintain better connection quality at certain times within the unit of time when the UE needs better connection quality at the certain time. Therefore, in the dynamic tuning method for a time-average SAR provided in the invention, the user may have better user experience.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in the UE. In the alternative, the processor and the storage medium may reside as discrete components in the UE. Moreover, in some aspects, any suitable computer-program product may comprise a computer-readable medium comprising codes relating to one or more of the aspects of the disclosure. In some aspects, a computer software product may comprise packaging materials.

It should be noted that although not explicitly specified, one or more steps of the methods described herein can include a step for storing, displaying and/or outputting as required for a particular application. In other words, any data, records, fields, and/or intermediate results discussed in the methods can be stored, displayed, and/or output to another device as required for a particular application. While the foregoing is directed to embodiments of the present invention, other and further embodiments of the invention can be devised without departing from the basic scope thereof. Various embodiments presented herein, or portions thereof, can be combined to create further embodiments. The above description is of the best-contemplated mode of carrying out the invention. This description is made for the purpose of illustrating the general principles of the invention and should not be taken in a limiting sense. The scope of the invention is best determined by reference to the appended claims.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A dynamic tuning method for a time-average specific absorption rate (SAR), applied to a user equipment (UE), comprising:
   determining, by a processor of the UE, a current frequency band in which the UE is operating, wherein each frequency band corresponds to a SAR table, and the SAR table comprises a plurality of code words;
   selecting, by the processor, a code word combination within a unit of time from the plurality of code words based on the SAR table corresponding to the current frequency band; and
   switching, by a switch circuit of the UE, to different switch states within the unit of time based on the code words comprised in the selected code word combination,
   wherein each switch state corresponds to a corresponding cord word of the selected code word combination.

2. The dynamic tuning method of claim 1, wherein different code words correspond to different respective set values at a same frequency band and the set values of each code word are different at different frequency bands.

3. The dynamic tuning method of claim 2, wherein the set values of each code word for different frequency bands are pre-stored in a memory device of the UE.

4. The dynamic tuning method of claim 2, wherein the values of each code word comprise an antenna total gain value and a total radiate power (TRP) value.

5. The dynamic tuning method of claim 1, wherein a conducted power of a radio frequency (RF) circuit of the UE is fixed within the unit of time for the time-average SAR.

6. The dynamic tuning method of claim 1, wherein the switch circuit comprises at least one of an impedance tuner and an aperture tuner.

7. The dynamic tuning method of claim 1, wherein each switch state corresponds to a corresponding circuit, wherein when the switch circuit switches to one of the switch states, the corresponding circuit of the switch state is enabled.

8. The dynamic tuning method of claim 1, wherein an average transmission power corresponding to the selected code word combination does not exceed a power limitation within the unit of time for the time-average SAR.

9. A user equipment for a time-average specific absorption rate (SAR), wherein each frequency band corresponds to a SAR table, and the SAR table comprises a plurality of code words, comprising:
- a processor, determining a current frequency band in which the UE is operating and selecting a code word combination within a unit of time from the plurality of code words based on the SAR table corresponding to the current frequency band; and
- a switch circuit, coupled to the processor and switching to different switch states within the unit of time based on the code words comprised in the selected code word combination,
- wherein each switch state corresponds to a corresponding cord word of the selected code word combination.

10. The UE of claim 9, wherein different code words correspond to different respective set values at a same frequency band and the set values of each code word are different at different frequency bands.

11. The UE of claim 10, further comprising:
- a memory device, coupled to the processor and pre-storing the set values of each code word for different frequency bands.

12. The UE of claim 10, wherein the values of each code word comprise an antenna total gain value and a total radiate power (TRP) value.

13. The UE of claim 9, further comprising:
- a radio frequency (RF) circuit, coupled to the switch circuit,
- wherein a conducted power of the RF circuit is fixed within the unit of time for the time-average SAR.

14. The UE of claim 9, wherein the switch circuit comprises at least on of an impedance tuner and an aperture tuner.

15. The UE of claim 9, wherein each switch state corresponds to a corresponding circuit, wherein when the switch circuit switches to one of the switch states, the corresponding circuit of the switch state is enabled.

16. The UE of claim 9, wherein an average transmission power corresponding to the selected code word combination does not exceed a power limitation within the unit of time for the time-average SAR.

* * * * *